Oct. 26, 1971  J. E. HAM  3,615,027
PIPE RACKING CONTROL SYSTEM
Filed Nov. 26, 1968  8 Sheets-Sheet 6

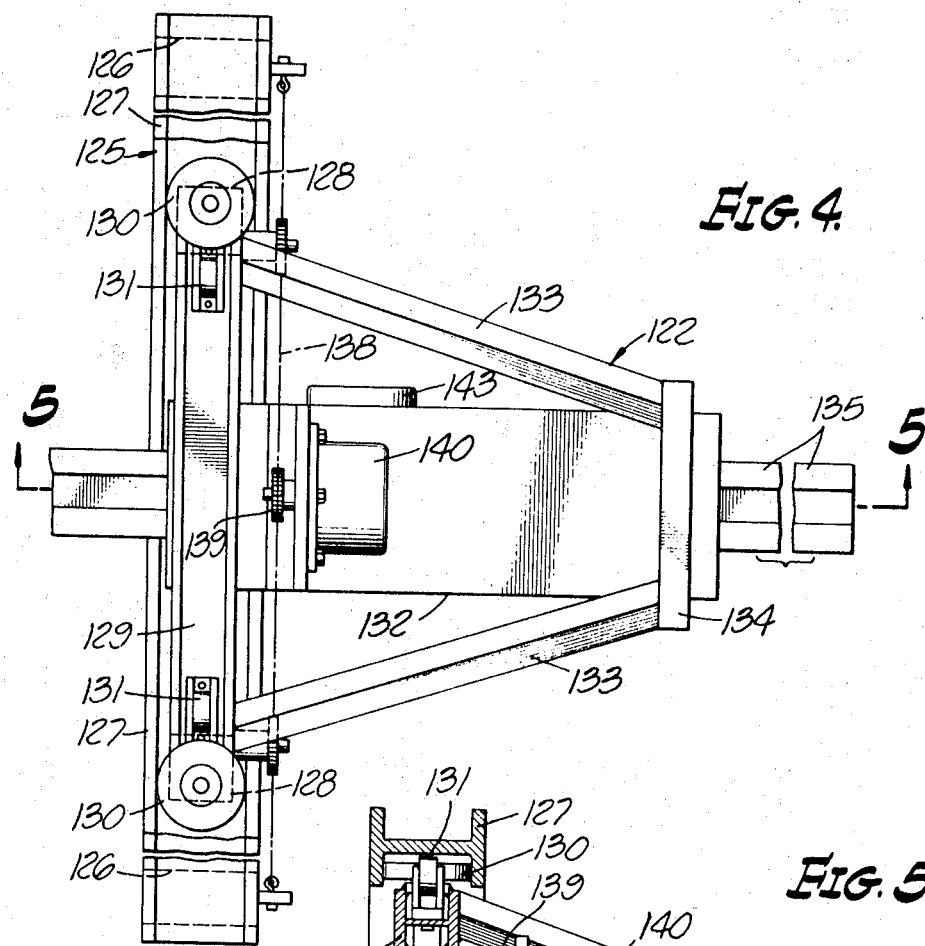
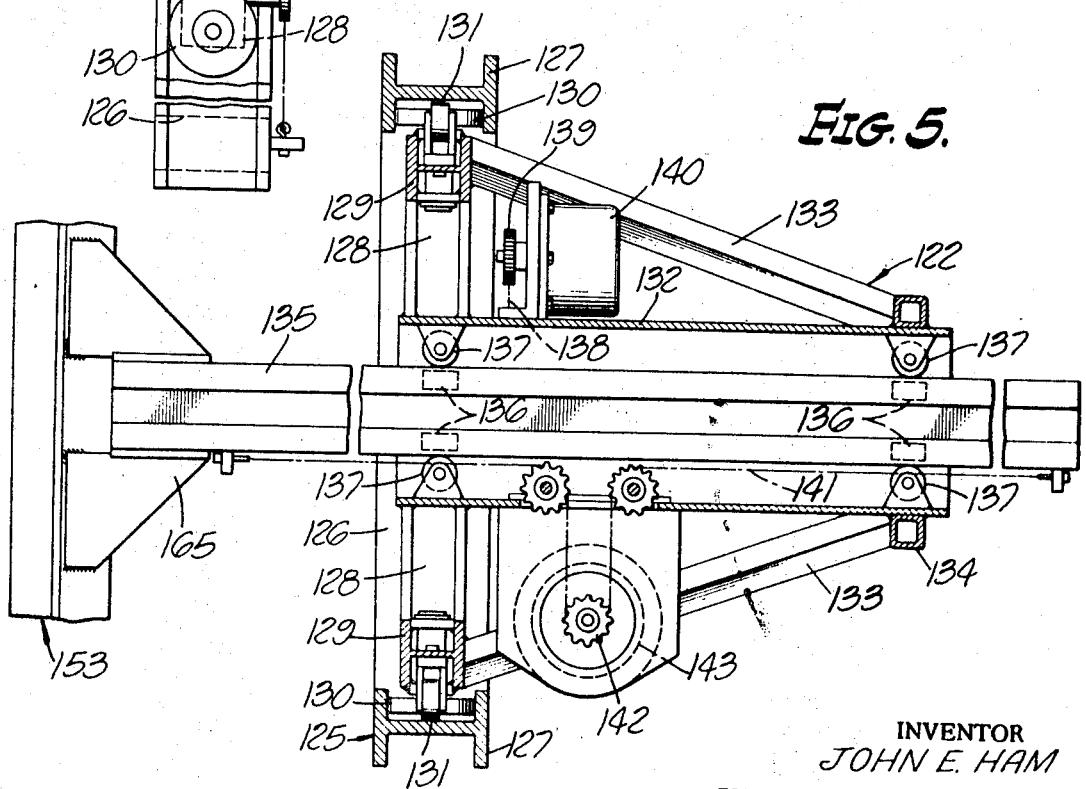

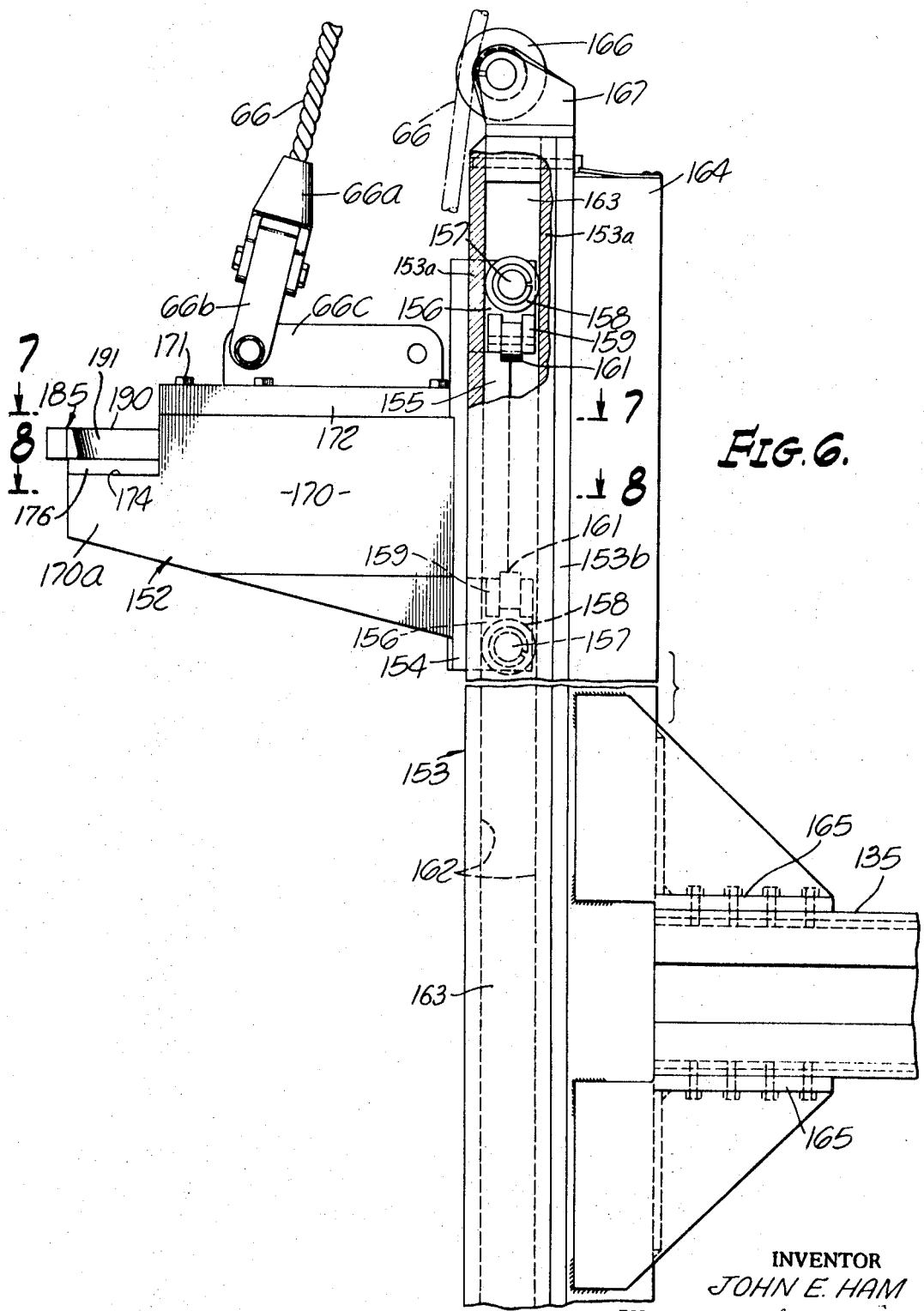

INVENTOR
JOHN E. HAM
BY C. G. Stallings
ATTORNEY

United States Patent Office 3,615,027
Patented Oct. 26, 1971

3,615,027
PIPE RACKING CONTROL SYSTEM
John E. Ham, Los Angeles, Calif., assignor to
Byron Jackson Inc., Long Beach, Calif.
Filed Nov. 26, 1968, Ser. No. 779,171
Int. Cl. E21b *19/14*
U.S. Cl. 214—2.5      21 Claims

ABSTRACT OF THE DISCLOSURE

Control and operating systems for well pipe racking apparatus in which a number of vertically spaced racker arms are moved longitudinally to extend and retract the racker arms as well as laterally relative to the pipe racking finger board, the racker arms having pipe supporting means for moving a length of pipe between the racking finger board and a position disposed over the rotary table of a drilling rig, and in which the control and operating systems include a hydraulic operating system comprising a reversible variable displacement pump for supplying fluid at a selected rate to either of a pair of motors, one of which effects longitudinal movement of one of the racker arms and the other of which effects lateral movement of said one of the racker arms. Such control and operating systems in which a second reversible variable displacement pump is employed to selectively supply fluid to either of a pair of motors for effecting longitudinal movement and lateral movement of the rest of the racker arms. Such control and operating systems in which the control system includes selectively operable control circuits for enabling actuation of an upper and a lower racker arm from the same location or, alternatively, to enable operation of the lower racker arm from said location and operation of the upper arm from another location. Such a control system in which a variable displacement pump is adjusted and caused to operate in reversed directions to displace fluid to the racker arm operating motors at a rate proportional to the extent of movement of a control member.

BACKGROUND OF THE INVENTION

Particularly in the operation of offshore well drilling platforms or barges the maintenance of personnel for operating the drilling rig is extremely expensive, giving rise to the need for automated or semi-automated well drilling and pipe handling equipment, including apparatus for effectively racking the stands of drill pipe in an out-of-the-way location when the drill pipe is idle and when the drill string is being removed in order to change bits.

Heretofore, racking apparatus has been devised for supporting the stands of pipe in substantially vertical positions at one side of the derrick, as exemplified in: More, U.S. Pat. No. 2,507,040; Stone, U.S. Pats. Nos. 2,619,234 and 2,628,725; and Corn, U.S. Pat. No. 2,703,178.

SUMMARY OF THE INVENTION

The present invention provides pipe racking apparatus generally similar to that disclosed in the above-mentioned prior patents, but the present apparatus being improved in respect of the mode of operation of the pipe racking arms which are employed to move the individual stands of pipe between racked positions and positions disposed above the rotary table.

The present invention more particularly provides control and operating systems for racker arms which are longitudinally extensible and retractable in vertically spaced horizontal planes and which are also laterally movable in said planes, whereby a derrick man or an operator on the derrick floor may conveniently and with accuracy effect the controlled movement of the vertically spaced racker arms between the pipe racking position and a position at which a pipe is disposed above the rotary table. In addition, the control and operating systems enable the movement of the racker arms between said positions at a variable rate, so that the operators may rapidly move the racker arms when desired but may also move the racker arms at a slow rate in order to accurately locate the pipe stands at desired positions.

In accomplishing the foregoing, electrohydraulic control and operating systems are employed involving the utilization of a reversible and variable displacement pump to supply operating fluid at a selected rate to either a first motor which is adapted to effect longitudinal movement of a racker arm or to a second motor which is adapted to effect lateral movement of the same arm, the electrical control system being such that fluid is supplied from the pump to only one of the arm shifting motors at a time.

The invention provides, furthermore, control and operating systems whereby actuator means under the control of an operator may be disposed in a convenient location, for example, on the derrick floor within easy reach of a "floor man."

Other objects and advantages of the invention will be hereinafter described or will become apparent to those skilled in the art, and the novel features of the invention will be defined in the appended claims.

BRIEF DESCRIPTION OF THE DRAWINGS

FIG. 4 is an enlarged fragmentary view in horizontal section, as taken on the line 4—4 of FIG. 2;

FIG. 5 is a view in vertical section, as taken on the line 5—5 of FIG. 4;

FIG. 6 is an enlarged fragmentary detail view showing the intermediate racker head and support, certain of the parts being broken away;

DESCRIPTION OF THE PREFERRED EMBODIMENTS

Figure 1:
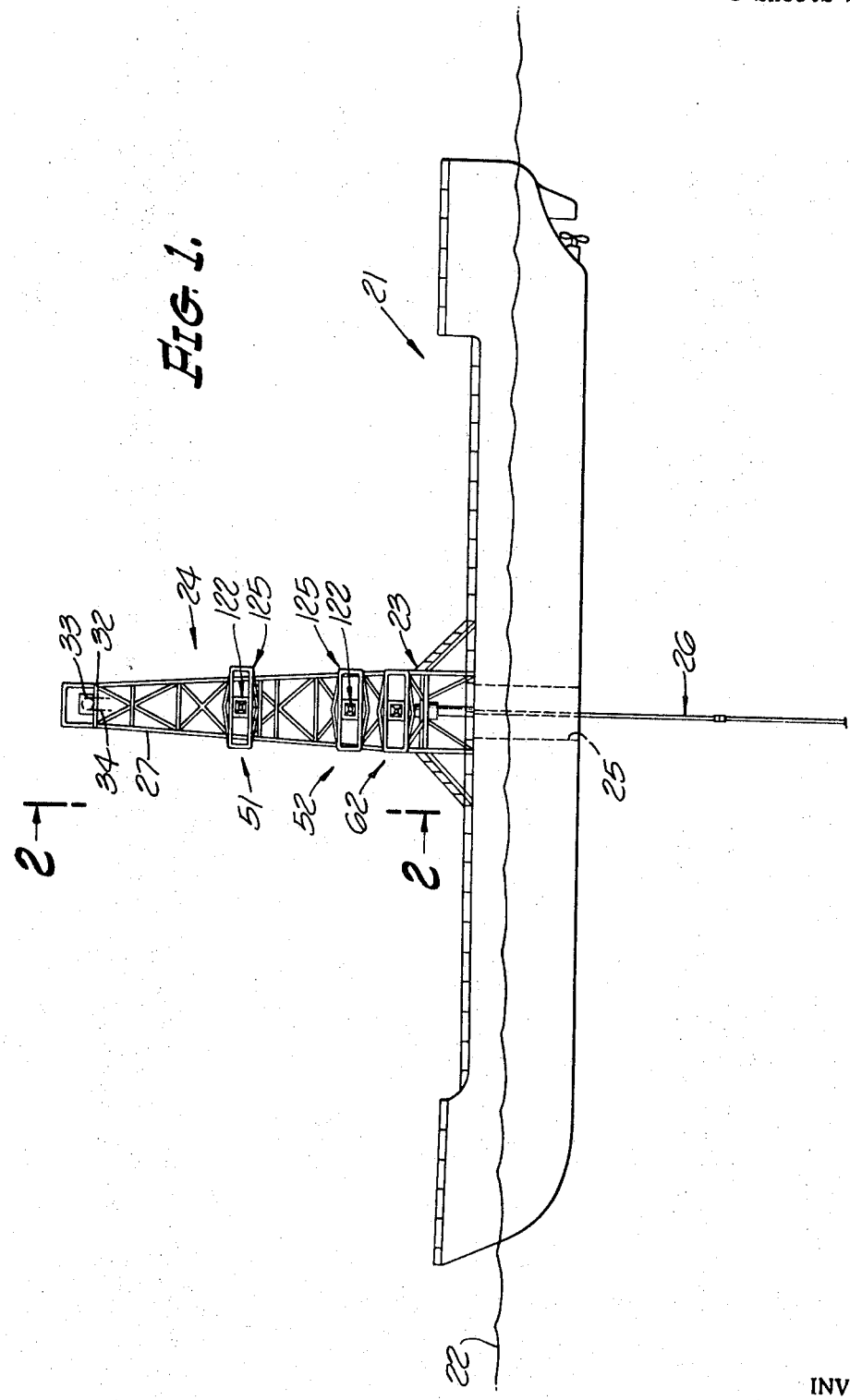
FIG. 1 is a side elevational view of a drilling ship having a derrick assembly, and including racker apparatus useful in the present invention.
Figure 2:
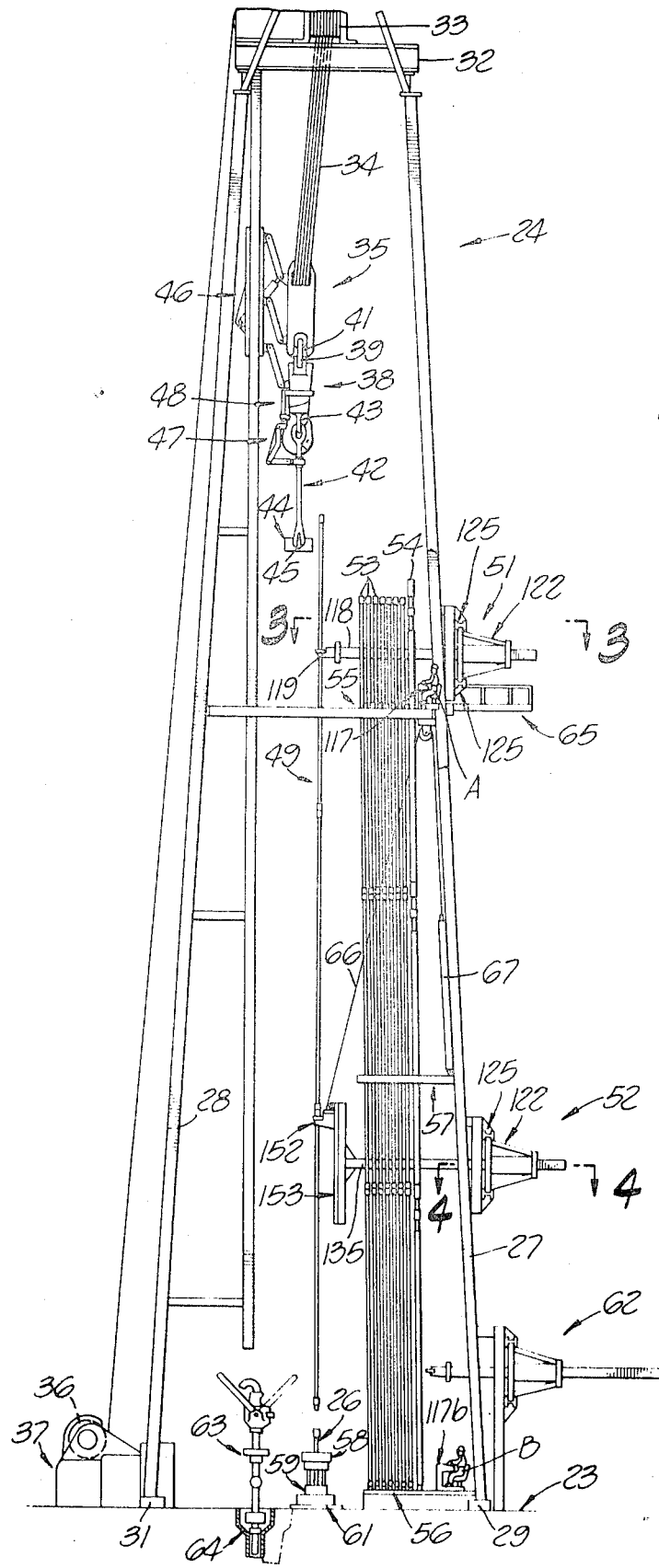
FIG. 2 is an enlarged side elevational view of the derrick assembly, taken on the line 2—2 of FIG. 1.

Referring to FIGS. 1 and 2, there is shown a drilling ship 21 afloat in the water, the surface of the water being designated 22. The ship has an elevated platform 23 positioned amidships. Erected on the platform is a drilling derrick 24. The ship has a moon hole 25 through which a drill string 26 extends from above the platform 23 into the water and thence into the earth (not shown) below. As this type of drilling ship with a plaftorm and derrick is widely known in the field to which the invention pertains, it need not be described here in further detail.

The derrick 24 is shown somewhat schematically, sway braces, guy wires and similar structural members being omitted to enable working apparatus to be shown more clearly. The derrick has generally vertical corner posts 27 and 28 supported on the platform 23 on base members 29 and 31. A water table 32 near the top of the derrick carries the usual crown block 33 which is aligned with the vertical center line of the derrick. Suspended from the crown block by cable 34 is a traveling block 35. As is usual, one end (not shown) of the cable 34 is anchored to the ship's structure, and the other end is led to the spool 36 of a drawworks 37 for raising and lowering the traveling block and the load supported thereby.

A hook structure 38 is swingably suspended from the bottom of the traveling block 35 by interengaged bails 39 on the hook and 41 on the block. An elevator link 42 is swingably suspended from an ear 43 on the hook structure, and the link has an elevator 44 swingably attached by another ear 45 to the lower end of the link 42. A second elevator link (not seen in FIG. 2) on the other side of the hook structure 38 similarly connects the elevator 44 to the hook structure 38.

The general reference numeral 46 denotes apparatus for positioning and guiding the block and hook structure. An elevator link stabilizing device is designated by the general reference numeral 47. The general reference numeral 48 designates apparatus for supplying compressed air to the elevator 44 to actuate it. The details of the herein block and hook stabilizing and positioning means 46, the link stabilizing means 47, and the means 48 for supplying air to the elevator 44 are more particularly disclosed in Letters Patent as follows:

Jones and Turner, Jr., Block and Hook Structure Positioning and Guiding Apparatus, U.S. Pat. No. 3,507,405;
Langowski and Turner, Jr., Link Stabilizer for Well Drilling Rigs, U.S. Pat. No. 3,526,425;
McFadden, Fluid Conductor Means for Hook Mounted Elevator, U.S. Pat. No. 3,479,062; and
Turner, Jr., Stabilized Pipe Supporting Structure for Drilling Rigs, U.S. Pat. No. 3,498,586.

A stand 49 of drill pipe is shown as being supported by pipe-handling equipment including an upper racker assembly 51 and an intermediate pipe supporting racker assembly 52, which will be hereinafter described. Other stands 53 of drill pipe or drill collars 54 are shown at rest in a pipe rack having a finger board 55, a base 56, and an intermediate rack member 57. The upper end of the string of drill pipe 26 is shown projecting above the power tongs 58, the slips 59, and the rotary table 61. Casing manipulating apparatus is shown at 62. A swivel and kelly assembly 63 is disposed in the rat hole 64. These racker assemblies are more particularly illustrated and described in the patent application of John W. Turner, Jr., Well Pipe Racker, U.S. Ser. No. 731,542, filed May 23, 1968 now Pat. No. 3,561,811, issued Feb. 9, 1971.

Projecting outwardly from the derrick and positioned under the racker 51 is a horizontal stage 65 upon which an operator may stand to adjust or repair the racker.

Associated with the racker 52 is a cable 66 actuated by a fluid-powered positon-and-cylinder motor 67 for raising and lowering the racker head, as will be hereinafter described in detail.

Figure 3:
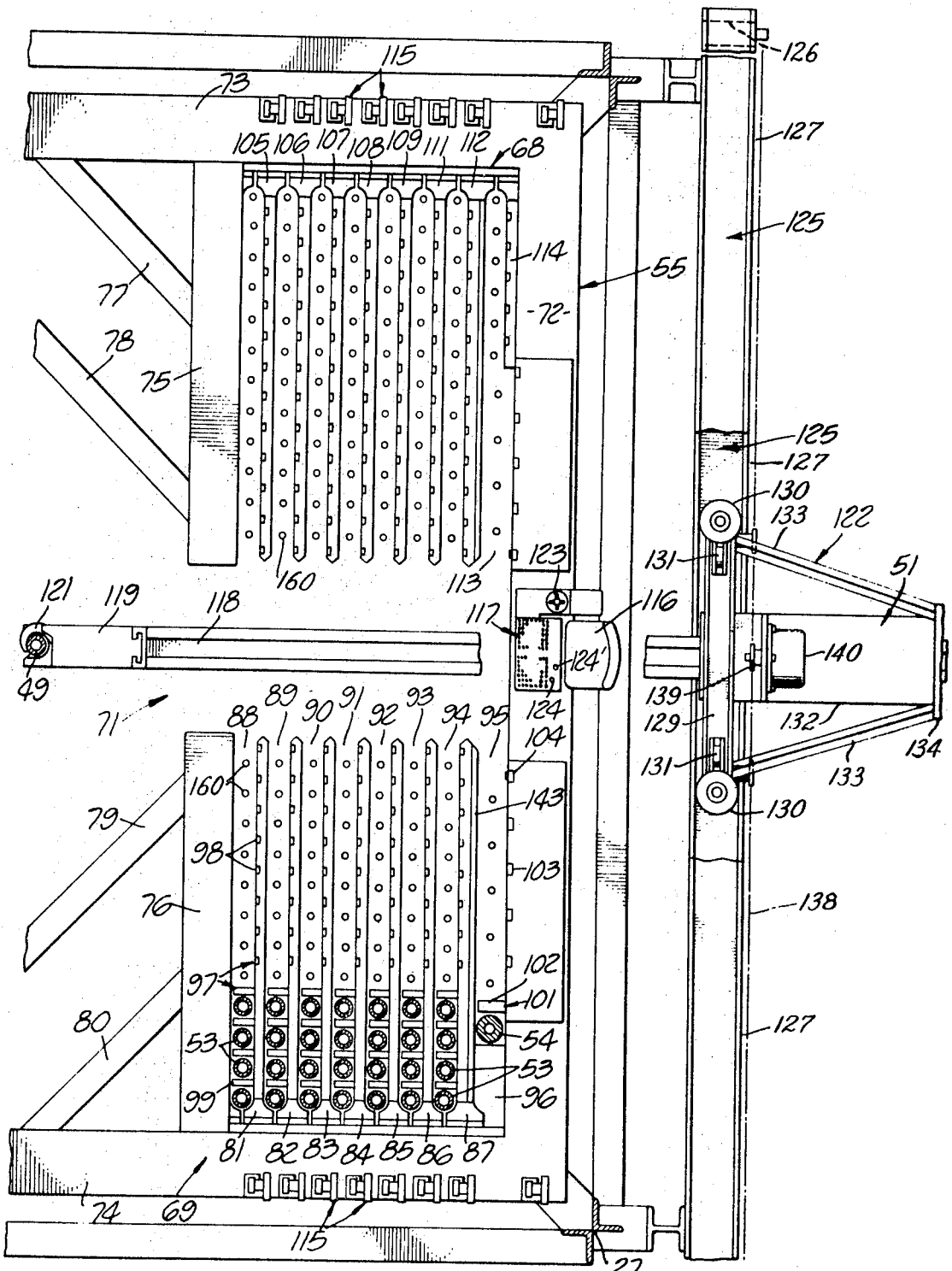
FIG. 3 is an enlarged fragmentary view showing in plan certain of the racking apparatus, and taken on the line 3—3 of FIG. 2.

Referring next primarily to FIG. 3, the finger board assembly 55 is shown as being in two sections; one, 68, located on the right-hand side and the other, 69, located on the left-hand side of a central opening 71. It is noted that this finger board assembly 55 may be positioned at a considerable height in the derrick 24, for example, approximately 90 feet above the platform 23.

The finger board assembly 55 has what may be termed a rear rail 72 extending across the derrick man's side of the combined finger board assembly 55. Extending across the outer or closed side of the right-hand finger board section 68 is what may be termed the end rail 73, and extending across the left-hand outer end of the finger board section 69 is what may be termed the end rail 74. Extending inwardly from the end rails 73 and 74 are the front rails 75 and 76, respectively. The rails 72, 73, 74, 75 and 76 comprise the framework for supporting the finger board sections, and may be referred to as a walk-around. The front rails 75 and 76 have the braces 77, 78, 79 and 80.

Mounted on the end rail 74 are the drill pipe fingers 81, 82, 83, 84, 85 and 86, and one or more drill collar fingers 87. These fingers are mounted on their left-hand ends to extend horizontally toward a median vertical plane of the derrick and are spaced apart laterally from the front rail 76 to the drill collar finger 87 a distance sufficient to accommodate the size of drill pipe to be racked therein. The finger 87 is spaced from the rear rail 72 a distance to accommodate the diameter of the drill collar to be racked therein. The space between the front rail 76 and the finger 81 is here shown at 88. This space extends from the outer end of the finger to the base of the finger near the rail 74 and has sufficient horizontal depth to accommodate a selected number of stands of pipe, in the illustration here shown as twelve. The same holds true with respect to the spaces 89, 90, 91, 92, 93 and 94. The space 95 between the drill collar finger 87 and the rear rail 72 is greater than that between the other fingers, but the depth of the space is shown as being such that it will accommodate six stands of drill collars. The left-hand end of the space is shown as being closed by a gusset 96 which is preferably attached between the rear rail 72 and the drill collar finger 87 and extends horizontally outward a distance to provide a support and reinforcement for the assembly and a stop for the first drill collar stand 54 racked therein.

Each of the fingers 81 through 87 has a series of spaced latches 97 spaced apart a sufficient distance to accommodate the diameter of a drill pipe, and extending from end to end of the fingers, there being shown in the illustration twelve such latches for each finger. The latches are indicated in their opened or raised position at 98, for example, and in the closed position at 99. In the opened position, pipe may be moved freely into and out of the openings between the fingers.

Similarly, the rear rail 72 has a number of drill collar latches 101 extending for the length of the opening 95 at spaced intervals. The drill collar latches are indicated closed at 102 and opened at 103 for a purpose similar to the opened and closed latches of the racking fingers above described. At the outer end of the opening 95, the drill collar latch, here designated 104, is shown as reinforced.

The right-hand racking board section 73 is provided with drill pipe fingers 105, 106, 107, 108, 109 and 111, to accommodate drill pipe, and with the drill collar finger 112. In general, these fingers are identical with the fingers 81 through 87 above described, and function the same way. The space here shown as space 113, between the drill collar finger 112 and the rear rail 72, has, in the right-hand end thereof, what may be termed a stub finger 114 which reduces the width of the space between the drill collar finger 112 and the rear rail 72 for the purpose of the racking of drill pipe between the stub rail 114 and the drill collar finger 112. However, between the end of the stub finger 114 and the open end of the space 113, provision is made for the racking of drill collars, here shown as spaces (sometimes referred to as "compartments") for drill collars. The stub finger 114 has the same latch arrangement as the other fingers, and the drill collar latches are provided in connection with the rear rail 72 the same as was the situation with respect to the left-hand racker section 69.

These various latches are not germane to the present invention, and their structure and mode of operation may be ascertained in detail by reference to Johnson and Turner, Jr., Finger Board and Racker Apparatus, U.S. Pat. No. 3,501,017. However, these latches may be hydraulically operated. Therefore, in FIG. 3, there are shown on each rail 73 and 74, manifolds 115, there being in the illustration shown one manifold for each racking finger. Each manifold contains suitable valve means and solenoids (not shown) for actuating the valves for each latch on the racking finger served thereby, together with hydraulic lines leading to the latch-actuating mechanism and electrical connections leading to a console switch under control of a derrick man.

In this connection, the derrick man (shown at "A" in FIG. 2) has a seat 116 and a console 117 preferably centered between right and left-hand racking sections and facing toward the center of the drilling derrick 24 along the space 71. This console has two banks of toggle switches schematically illustrated thereon, a switch for each latch and a row of switches for each racking finger.

There is also illustrated in FIG. 3 a portion of the upper racker means 51, including a racker arm 118 having a racker head 119 with pipe-guiding means 121, herein referred to as a hook or claw 121. Illustrated as being held in the claw 121 is the drill pipe 49. The racker arm 118 is mounted in a carriage 122 and has means, as will hereinafter be described, for extending and retracting the arm longitudinally. In addition, the carriage 122 is mounted in a horizontal track means or frame structure 125 extending horizontally along the side of the derrick, and has means, as will also hereinafter be described, under control of the derrick man or a "floor man" B for moving the carriage laterally in the track means from side to side of the derrick. Such racker arms and carriage means are actuated by hydraulic motors under control of the electro-hydraulic systems hereinafter to be described; the control handle 123 being shown schematically on the right-hand side of the derrick man's console 117. This console 117 also has valve means indicated schematically at 124 and 124' for manipulating the racker head and claw for grasping and releasing the pipe 49. It is noted that the racker arm 118 normally will be at a height so that it may pass over the derrick man's station without interfering with his position.

Referring again briefly to FIG. 2, the intermediate racker assembly 52 is under control of the aforementioned floor man B. A console 117b, but without the toggle switches to control the latches, is operated by the floor man B to operate the intermediate racker 52, which will now be described.

Referring again to FIGS. 1 and 2, it will be noted that the intermediate racker assembly 52, like the upper assembly 51, comprises a carriage 122 and a frame structure 125 which supports the carriage 122 for movement laterally with respect to the side of the derrick. The general details of the carriage and frame structures are shown in FIGS. 4 and 5. The frame 125 comprises vertical side members 126 and horizontal channel members 127 interconnected at their ends and suitably reinforced to form a rigid rectangular frame suitably affixed to the side of the derrick. The carriage 122 also includes rigid side members 128 and top and bottom members 129 interconnected at their ends and forming a rectangular carriage support disposed between the structural members 126 and 127 of the frame 125. Suitable roller means, including upper and lower rollers 130 on the carriage support are revolvable on vertical axes and are disposed in the frame channel members 127 to support the carriage against tilting; and other roller means, such as a number of rollers 131 revolvable on horizontal axes above and beneath the upper and lower carriage support members 129, engage in the channels of the horizontal frame members 127 to support the vertical load of the carriage 122 while facilitating movement of the carriage from side to side in the frame 125.

A hollow guide 132 is centrally supported in the carriage support members 128 and 129 by suitable rigid braces 133 and an outer rectangular carriage support 134. Reciprocable in the guide 132 is a rigid elongated racker arm 135 adapted to move longitudinally in the guide 132. Preferably, suitable rollers are interposed between the sides of the arm 135 and the inside of the guide 132, as indicated at 136, and other rollers 137 are interposed between the top and bottom of arm 135 and the guide 132 so as to facilitate longitudinal movement of the arm 135, notwithstanding the face that the arm may support a large weight at its end, namely, a stand of drill pipe or drill collar, as will hereinafter appear.

Means are provided for effecting lateral movement of the carriage 122 within the frame 125, and, illustratively, such means comprises a drive chain 138 extending across the frame 125 and connected at its ends to the frame side members 126, the chain engaging a drive sprocket 139 adapted to be driven by a reversible motor 140, the motor being suitably mounted on the guide 132. Means are also provided for effecting longitudinal movement of the arm 135, and, illustratively, such means comprises a chain 141 extending longitudinally beneath the arm and attached at its opposite ends to the arm. A sprocket 142 driven by a reversible motor 143 acts to move the chain 141 and thus the arm longitudinally of the guide 132. In a manner requiring no further illustration, it will be understood that both of the chain drive motors 140 and 143 may be conventional rotary hydraulic motors adapted to be operated in reverse directions in response to manipulation of control means under control of the floor man B at the console 117b. It will also be understood that the carriage 122 of the upper racker 51 and the arm 118 thereof may be caused to traverse the upper frame 125 and to be longitudinally shifted, in the same manner as just described, and that the casing handling means 62 consists of a similar carriage and arm assembly and provides a lower racker.

At the inner end of the racker arm 135 of the intermediate assembly 52 is a racker head 152 adapted for vertical movement in a head support 153 which is rigidly joined with the arm 135. The details of this head and head support structure are best seen in FIGS. 6, 7 and 8.

In this connection, the racker head 152 includes a support plate 154 extending vertically and having a central flange 155 projecting outwardly therefrom and made a part thereof as by welding. Adjacent its upper and lower ends, the plate 154 has bearing blocks 156, each adapted to support an axle 157 for a pair of rollers 158. Each block 156 also has ears 159 projecting therefrom for supporting axles of rollers 161. While the rollers 158 and 161 are shown in FIG. 6 only on the visible side of plate 154, it will be understood that similar rollers should also be provided at the other side of plate 154. The rollers 158 and 161 are revolvable on horizontal axes displaced 90°, whereby to support the head 152 against cocking in any direction relative to the head support 153. This support 153 is a vertically elongated fabricated body having side members 153a providing channels defined by opposing walls 162 adapted to receive the rollers 158 therebetween and the members 153a cooperating to provide opposing side walls 163 adapted to receive the rollers 161 therebetween. These channel members 153a are welded or otherwise connected to a vertical plate 153b, which, in the illustrative embodiment, is welded or otherwise attached to a channel member 164, which is, in turn, connected to the inner end of the racker arm 135, as seen in FIG. 6, by means of reinforced brackets 165. In any event, the construction of the head support 153 and its connection to the arm 135 should be strong and rigid, since it must support substantial weight and hold the racker head 152 against undesired movement, even when the vessel is subjected to heavy pitch and roll and the head 152 may be supporting a stand of pipe or drill collars, and as such stand is being elevated or lowered or moved laterally into the racking fingers previously described.

Such elevation and lowering of the racker head 152 is accomplished by the cable 66, previoulsly described, which is suitably connected to the racker head, as seen in FIG. 6, for example. In this illustrative embodiment, the cable 66 is provided with a rope socket 66a connected by a clevis or other connector 66b to a web 66c provided on the head 152. In addition, if desired, a roller 166 may be journalled between ears 167 provided at the upper end of the head support 153, so as to engage the cable, as seen in broken lines in FIG. 6, when the head 152 is lowered.

Figure 7:
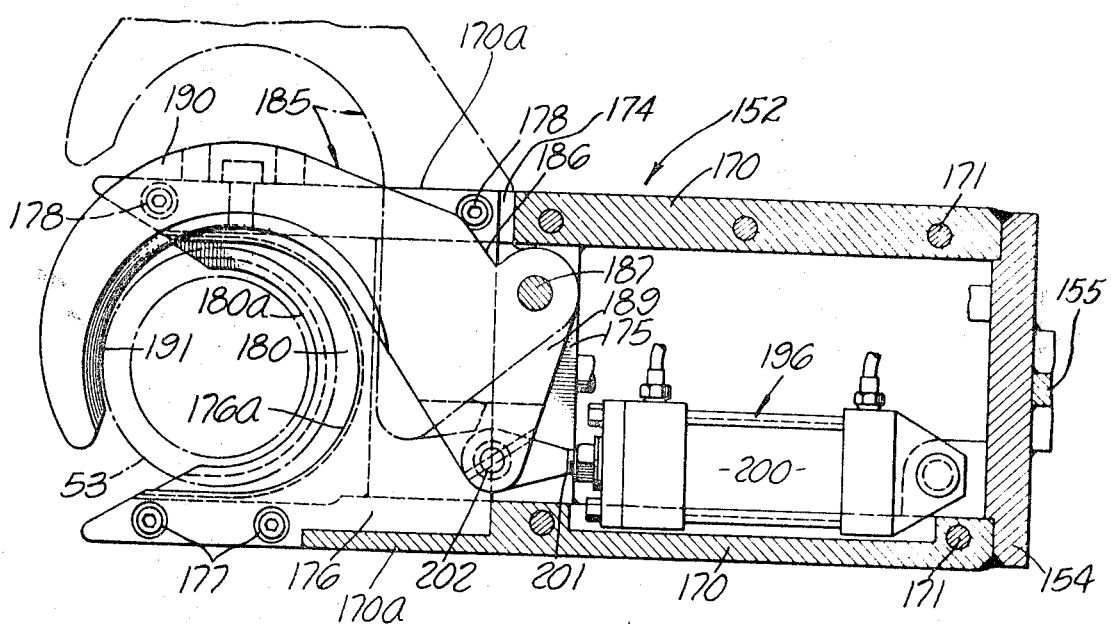
FIG. 7 is a fragmentary view in horizontal section and on an enlarged scale, as taken on the line 7—7 of FIG. 6.
Figure 8:
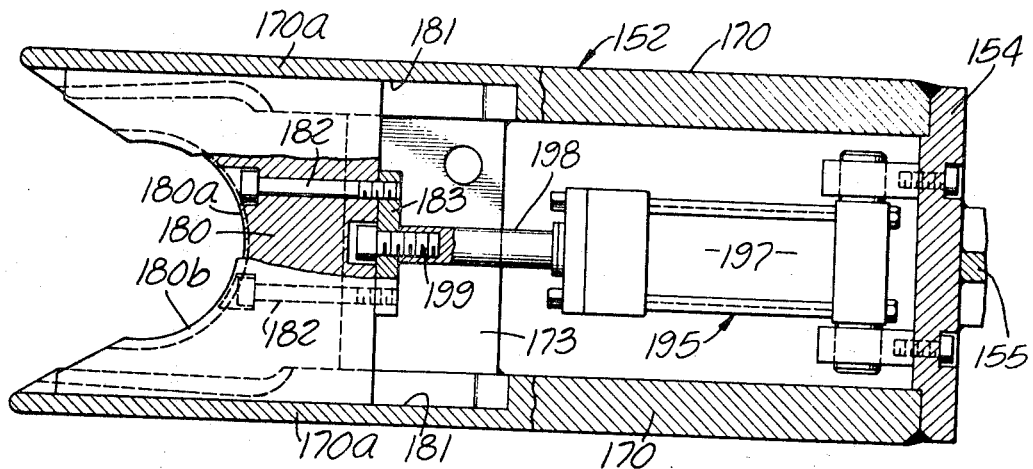
FIG. 8 is a fragmentary view in horizontal section and on an enlarged scale, as taken on the line 8—8 of FIG. 6.

The racker head 152, as seen in FIGS. 6 and 7, comprises opposing side walls 170 connected as by screws 171 beneath a top wall 172 and suitably otherwise braced as by a crosspiece 173, shown in FIG. 8. At their ends facing into the derrick, the walls 170 of the head 152 are provided with extensions 170a of reduced height providing upper horizontal surfaces 174; and between these wall extensions is a support plate 175, welded or otherwise affixed, and having its upper surface flush with the extension surfaces 174 of walls 170. An adaptor plate 176 is disposed on the surfaces 174, being secured thereto by fasteners 177 and fasteners 178 (see FIG. 7). This adaptor plate 176 has a throat or pipe opening of a desired size, say to fit under the shoulder of a drill collar, as will hereinafter be more fully described; and the peripheral edge of the throat is provided with a surface or radius at 176a for this purpose. Below this surface 176a, the periphery of the plate defining the throat flares outwardly so as to not interfere with the proper engagement of the surface 176a with the shoulder of the drill collar.

In order that the head may be capable of also supporting pipe of a diameter smaller than that supportable on the surface 176a, slide means are provided, as best seen in FIG. 8, including a slide plate 180. This plate 180 is slidably disposed in opposed grooves 181 in the side wall extensions 170a of the head, and is connected by fasteners 182 to a slide actuator head 183 so as to be reciprocable in the grooves 181 as will later be described. Slide plates 180 of the desired size may be employed, say a slide plate 180 related to the adaptor plate 176, so that the head 152 is adapted to support related drill pipe and drill collar sizes. In this connection, the slide plate 180, as best seen in FIG. 7, has a throat or pipe opening 180a adapted to receive a drill pipe of a smaller diameter than the throat of the adaptor plate 176. Moreover, the plate 180 is provided with a surface 180b (see FIG. 8) adapted to receive the body of the drill pipe and engage the taper or shoulder provided by the tool joint when the slide plate 180 is in the projected position of FIGS. 7 and 8, but this slide plate 180 may be withdrawn so as to not engage a larger pipe adapted to be engaged by the adaptor plate 176.

Accordingly, it will be understood that different combinations of adaptor plates 176 and slide plates 180, having related throat diameters, may be interchangeably employed in the head 152, whereby to enable the handling and racking of drill pipe and drill collars of a range of relative diameters.

Hook or claw means 185 are provided for engaging a drill pipe or drill collar above the support surfaces 176a and 180b, such means operating to urge the drill pipe or drill collars, as the case may be, into the throat of the slide plate 180 or the adaptor plate 176, respectively. More particularly, the claw means 185 comprises a lever 186 pivotally connected to the body of the racker head 152 as by means of a pivot pin 187, this pin extending downwardly through the upper wall 172 of the racker head into an opening provided in the previously described plate 175 which extends transversely between the side walls 170 of the racker head. The lever 186 includes an actuator arm 189 and a working arm 190, the latter extending generally arcuately in the nature of a hook or claw and having an inner arcuate surface 191 adapted, when the lever arm 190 is in one position, to engage a drill pipe tool joint or a drill collar to apply a force thereto tending to urge the same into the appropriate throat 180a or surface 176a of the drill pipe supporting slide 180 and the adaptor plate 176, respectively, while being movable to a second position, as shown in broken lines in FIG. 7, at which they are open for reception of the drill pipe or drill collar.

Actuator means 195 are provided for effecting the movement of the drill pipe supporting slide 180 between the outwardly projected position and the retracted position, and actuator means 196 are provided for effecting movement of the hook or claw lever 186 between the full line and broken line positions of FIG. 7. The first-mentioned actuator means 195 may comprise a fluid pressure operated actuator cylinder 197 having a rod 198 projecting therefrom and suitably connected to the slide actuator head 183 by a suitable fastener means 199, so that extension and retraction of the rod 198 will effect projection of the drill pipe supporting slide 180 to the pipe supporting position, and retraction of the rod 198 will effect movement of the drill pipe supporting slide 180 to the out-of-the-way position. The actuator means 196 also may comprise a fluid pressure actuator cylinder 200 having an actuator rod 201 projecting therefrom and pivotally connected as at 202 to the actuator arm 189 of the claw lever 186. Thus, projection of the rod 201 will effect pivotal movement of the lever 186 to the broken line position of FIG. 7, and retraction of the rod 201 will effect movement of the lever 186 to the full line position of FIG. 7.

It will be understood that the control of the respective actuator means 195 and 196 may be effected by the previously described floor man B by the operation of suitable valve control means.

Without requiring further illustration and with reference to FIG. 2, it will be apparent that the upper pipe racker head 119 on the racker arm 118 may be so constructed, including the provision of the previously described hook or claw 121 thereon, that said claw 121 may be opened or closed to confine an upper region of a stand of drill pipe, such as the stand 49 of FIG. 2, or a stand of drill collars, such as the stand 54 of FIG. 2, against lateral movement relative to the head 119; but the stand may be elevated and lowered relative to the head 119. In addition, while the means 62 of FIG. 2 has been previously described as casing handling apparatus, such means may include another head and claw means adapted to effect sliding engagement with the stand in certain pipe handling operations.

In the use of the apparatus as described above, the stand of drill pipe 49 illustrated in FIG. 2 in a position disposed above and in alignment with the drill string 26 supported in the slips 59 may be either made up in the pipe string 26 or moved into the rack therefor. In the latter case, the floor man B will effect operation of the motor 143 in a direction to effect retraction of the racker arm 135, and, correspondingly, such retraction of the racker arm 118 of the upper racker means 51 may be effected. When the stand of pipe 49 is retracted to a location aligned with the desired space between any of the racker fingers 81 through 87 or 105 to 112, the floor man B will arrest retraction of the racker arms 118 and 135 and effect lateral movement of the carriages 122 relative to the frames 125 of the racker means 52 and 51 by causing operation of the chain drive motor 140 in the desired direction, arresting such lateral movement when the stand is at the desired location between the fingers so as to be latched in place upon movement of the latch means previously described to a pipe stand confining position. Thereafter, the racker head 152 may be lowered by the actuator cylinder 67 so as to allow the pipe stand to come to rest upon the racker base 56 which may, if desired, be provided with upstanding protuberances, designated 160 in FIG. 3, for engagement in the open lower end of the pipe stand for holding the same against displacement responsive to pitch or roll of the vessel 21. Following this, the floor man B may effect opening of the claws 121 and 185 so that the racker heads may be moved in a reverse direction, that is, back to the center of the rack assemblies 51 and 52 and then back towards a position at which the next stand of pipe may be picked up. During the operation of racking a stand as just described, the pipe hoisting equipment, comprising the traveling block 35, the hook 38, the links 42 and the elevator 44, may be lowered so as to allow engagement of the next stand of pipe included within the drill string 26, so that the drill string may be elevated to a position for allowing removal therefrom of the next stand of pipe in response to operation of the power tong mechanism 58.

The operation of running the pipe stands will be understood without further description herein as being simply a reversal of the above-described operation. When drill collar stands 54 are to be run into the well or racked, as the case may be, the operations moreover are substantially the same as those described above, except for the fact that the drill pipe supporting slide 180 will be retracted by the actuator means 195 so as to allow engagement of the adaptor plate 176 with the drill collars. The upper head 119, thus, will be understood without need of illustration to include a retractable plate such as the plate 180 and an adaptor plate such as the plate 176, so that the upper head is adapted to guide pipe and drill collars of different diameters, while snugly held by the claw 121. Since the upper head in the illustrative embodiment is merely a guide, it will also be understood that the just-mentioned slide and adaptor plates will have openings, such as the throat 180a and surface 176a, respectively, of slightly larger size so as to receive the major drill pipe and drill collar diameters.

The casing manipulating apparatus 62, like the intermediate racker assembly 52 and the upper racker assembly 51, will be understood to comprise a racker arm similar to the racker arms 118 and 135, the casing manipulator racker arm having a head adapted to engage lengths of well casing, for example, when such casing is being moved into a well bore. Accordingly, it is desirable that the casing manipulator racker arm be capable of longitudinal extension and retraction during the manipulation of the casing as well as capable of lateral movements with respect to a line extending radially from the well bore.

Moreover, it will be understood that the upper racker assembly 51 and the casing handling apparatus 62 will include motor means for effecting longitudinal extension and retraction of the respective racker arms as well as the lateral movement of such arms, such motor means corresponding to the previously described motor means 140 and 143 of the intermediate pipe racker assembly 52.

Figure 9:
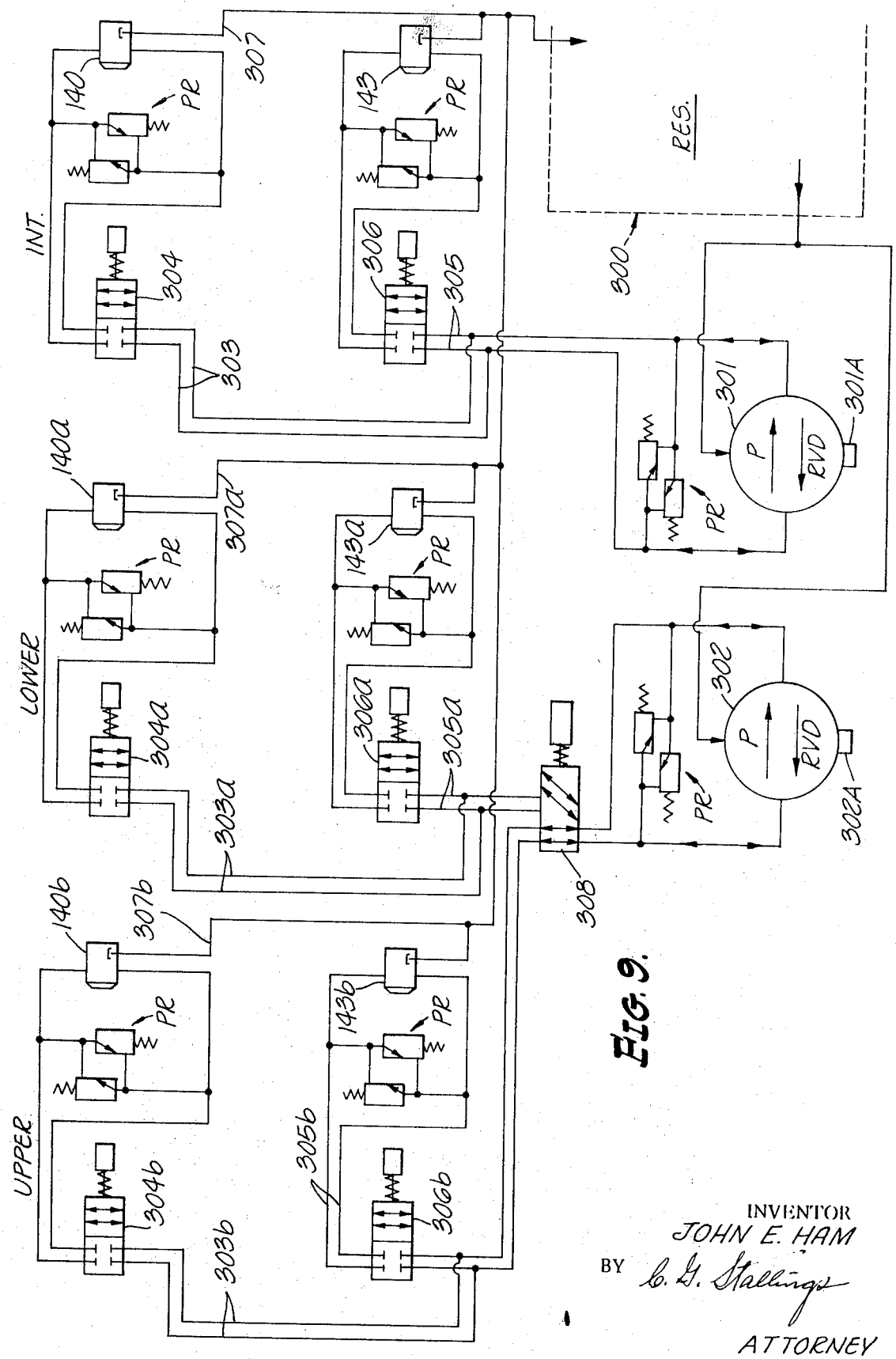
FIG. 9 is a schematic of an electrically controlled hydraulic system for actuating the racker arms.

As will now be described, these motor means for effecting actuation of the respective racker arms are adapted to be supplied with fluid under pressure from a reservoir which may be suitably located beneath the derrick floor. Referring to FIG. 9, such a reservoir is generally illustrated at 300, the reservoir being adapted to supply fluid to and receive fluid from the hydraulic systems for supplying pressurized fluid to the motor means for effecting actuation of the intermediate racker assembly, on the one hand, and the upper and lower racker assemblies, on the other hand. In these systems the carriage motor 140 and the racker arm motor 143 of the intermediate racker apparatus 52 are adapted to receive pressurized fluid from a reversible, variable, positive displacement pump denoted at 301.

A similar pump 302 is adapted to supply pressurized fluid to the carriage motor 140a and the racker arm motor 143a of the lower racker or casing handling apparatus 62. This reversible, variable, positive displacement pump 302 is also adapted to supply fluid under pressure to the carriage motor 140b and the racker arm motor 143b of the upper racker assembly 51. The motors 140, 140a and 140b for effecting lateral translations of the carriages of the respective rackers are reversible motors, of the positive type, operable in opposite directions depending upon the direction of flow of pressurized fluid thereto and, likewise, the motors 143, 143a and 143b are of the same reversible and positive type, so that the supply of fluid from the respective pumps 301 and 302 will effect reversal of the motors under the control of selectively operable valve means, and the speed of the motors will be a function of the volume displaced by the pumps 301 and 302.

The pump 301 is adapted to supply fluid to the intermediate racker carriage motor 140 and to return such fluid to the reservoir 300 via a pair of conduits 303 in which is a solenoid actuated valve 304, this valve being normally closed but being operable when energized to allow the flow of fluid through the conduits 303 in either direction so as to effect reverse operation of the motor 140. Correspondingly, a pair of conduits 305 lead between the intermediate racker arm motor 143 and the pump 301; and interposed between the motor 143 and the pump 301 is another solenoid actuated valve 306 normally closing the conduits 305 but adapted when energized to permit the flow of fluid through the conduits 305 in either direction so as to enable reverse operation of the motor 143. Each of the motors 140 and 143 is connected via a suitable dump conduit 307 to the reservoir 300, and without need of specific illustration herein, it will be understood that the motor systems may include suitable pressure relief valves generally denoted at PR as may be desired or necessary to establish and regulate the desired flow of fluid from the pump 301 to the motors 140 and 143.

A pair of conduits 303a having a solenoid operated valve 304a is adapted to supply fluid to the lower racker carriage motor 140a in either direction from the pump 302, and a pair of conduits 305a is similarly adapted to supply fluid in either direction to the lower racker arm motor 143a under the control of a solenoid actuated valve 306a. A pair of conduits 303b having a solenoid actuated valve 304b is adapted to supply fluid from the pump 302 to the upper racker carriage motor 140b, and, correspondingly, a pair of conduits 305b supplies fluid in either direction to the upper racker arm motor 143b under the control of a solenoid actuated valve 306b.

It is notable that another solenoid actuated valve 308 is interposed between the pump 302 and the pairs of conduits 303a and 303b, so that the fluid may be supplied from the pump 302 either via one of the valves 304a and 306a to the respective motors 140a and 143a or via the valves 304b and 306b to the respective motors 140b and 143b. In addition, a dump conduit 307a connects the motors 140a and 143a to the reservoir 300 and a dump conduit 307b connects the motors 140b and 143b to the reservoir 300. Like the system for the intermediate racker 52, the upper and lower racker systems 51 and 62 may also include suitable pressure relief valves PR.

From the foregoing it will be understood that the pumps 301 and 302 are adapted to effect the desired opposite drive of any of the motors 140, 140a, 140b and 143, 143a, 143b under the control of the respective solenoid valves 304, 304a, 304b and 306, 306a, 306b; but when the motors have effected the desired extent of carriage translation or longitudinal movement of the respective racker arms, de-energization of the solenoid valves will allow the latter to assume their normally closed positions blocking off the flow of hydraulic fluid to the respective motors so that further movement of the carriages and arms due to inertia forces is effectively braked, since flow of motor fluid is shut off. Moreover, due to the fact that the pumps 301 and 302 are of the variable displacement type, the rate of movement of the carriages and the racker arms may be varied by varying the rate of fluid displacement by the pumps. For example, the pumps 301 and 302 may be of the typical adjustable wobble plate type adapted to constantly run in a neutral position, but to have the angle of the wobble plate adjusted in either direction to effect reversal of flow at a desired rate. Thus, each of the pumps 301 and 302 is generally illustrated as having an actuator 301A and 302A, respectively adapted to effect the desired adjustment of the pump operation.

In order to effect operation of the pumps 301 and 302 as desired, as well as to effect energization of the respective solenoid valves 304, 304a, 304b and 306, 306a, 306b, suitable control means are provided adjacent to the derrick man A and the floor man B previously referred to. More particularly, such controls may be incorporated in the derrick man's console 117 and in the floor man's console 117b and may comprise operating means, for example, of the type shown and described in the application for U.S. Letters Patent of John E. Ham, Ser. No. 779,046, filed Nov. 26, 1968 for Multi-Directional Control, now Pat. No. 3,550,466, issued December 29, 1970. In any event, actuator means are provided for simultaneously effecting actuation of the respective pumps 301 and 302 in the desired direction and operation of the respective solenoid valves 304, 304a, 304b and 306, 306a, 306b.

Figure 10:
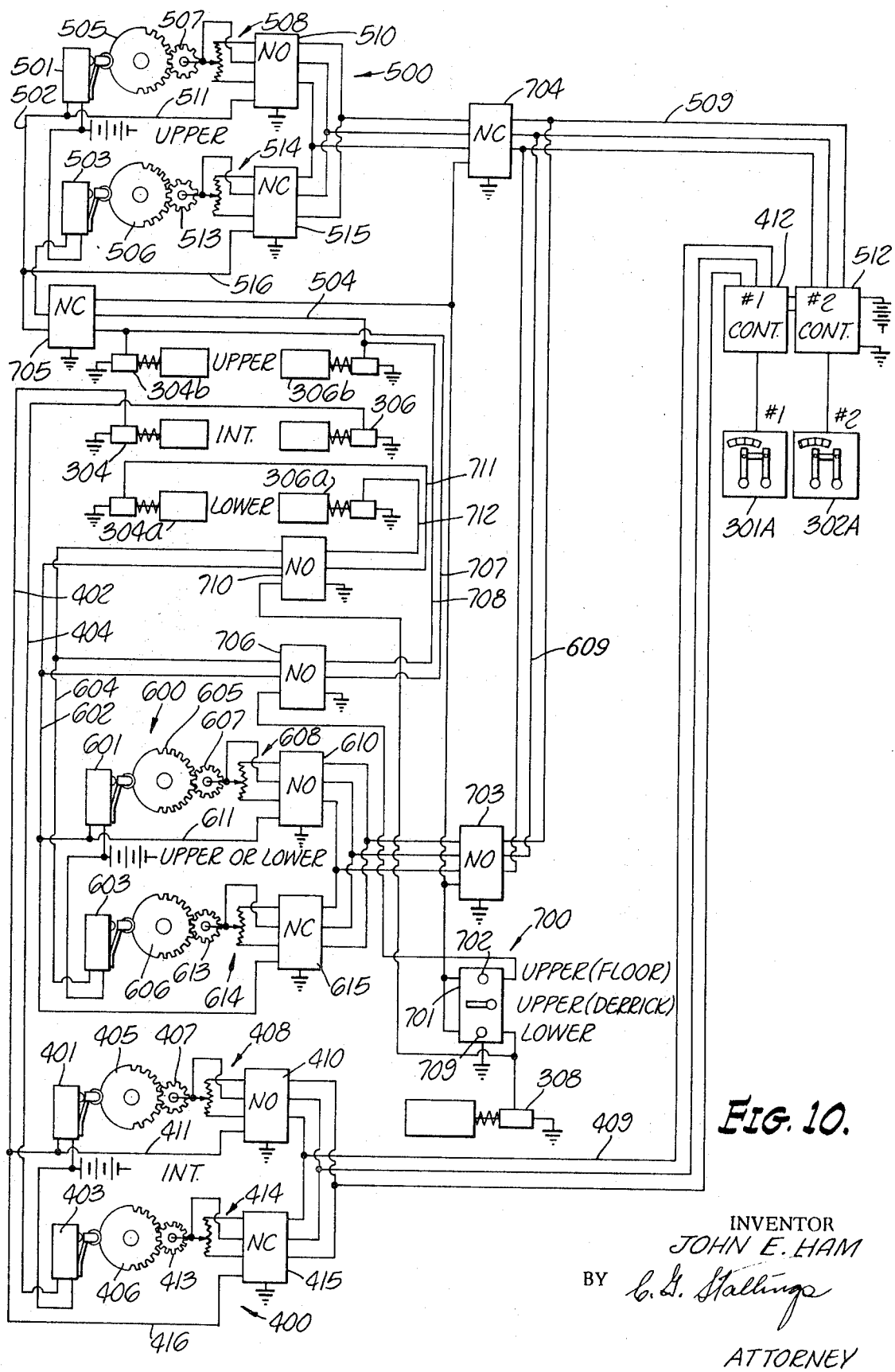
FIG. 10 is a schematic illustration of the electrical control system for the hydraulic system of FIG. 9.

Referring to FIG. 10, operating means generally denoted at 400 are illustrated as being adapted for control of the intermediate racker assembly 52. At 500 there is generally illustrated a similar control means for the upper racker assembly 51. At 600 there is generally illustrated a control means for the lower casing handling apparatus or racker 62, this means 600 also being selectively operable to control operation of the upper racker apparatus 51 as will hereinafter be described.

The control means 400 includes, for example, a first micro-switch 401 in a circuit, one side of which is designated 402, with the solenoid valve 304 which controls the flow of pressure fluid from pump 301 to the carriage motor 140 of the intermediate racker assembly 52. Also included in the control means 400 is a second micro-switch 403 which is in a circuit, one side of which is designated 404, with the solenoid valve 306 which controls the flow of fluid to the racker arm motor 143 of the intermediate racker apparatus 52. Operating means are herein illustrated as a rotary member 405 adapted to close the switch 401. A similar rotary member 406 is adapted to close the switch 403. Simultaneously, with closure of either of the switches 401 or 403, the rotary members 405 and 406 are adapted to effect adjustment or the desired operation of the pump 301, but it is desired that the operation of the motors 140 and 143, upon operation of either of the actuators 301A or 301B, be exclusive of one another.

Accordingly, the rotary operator 405 is illustrated as being in the form of a gear segment in mesh with a gear 407 which drives the center tap of a potentiometer 408, the latter being connected in a circuit 409 by a normally open relay 410. This relay 410 is connected by a conductor 411 with the switch 401 so as to close the relay 410 upon closure of the switch 401. When the relay 410 is closed, the circuit 409 is completed to a first or "#1 CONT." feed-back controller or other suitable slave motor means 412 which will respond to the adjustment of the potentiometer 408 to correspondingly adjust the actuator 301A of the pump 301, as previously described. The details of the particular slave motor system need not be specifically illustrated herein since various selsyn motor type controls or the like may be availed of whereby to adjust the function of the pump 301 both as to direction and rate of flow in response to movement of the member 405 in either direction and to a given extent.

The operator member 406 is also illustrated as being a segment of a gear in mesh with a gear 413 which drives the center tap of a potentiometer generally denoted at 414, the latter being connected in the circuit 409, previously referred to, by a normally closed relay 415, this relay also being connected by a conductor 416 to the micro-switch 401. Thus, closure of the micro-switch 401, in response to movement of the operator member 405 in either direction, both closes the normally open relay 410 and opens the normally closed relay 415, whereby the circuit 409 is at all times isolated from one or the other of the potentiometers 408 and 414. However, upon closure of the micro-switch 401, the potentiometer 414 is effective through the circuit 409 to energize the previously referred to slave motor means 412. Thus, movement of the operator member 406 in either direction will also effect corresponding adjustment of the direction and rate of flow of the pump 301.

As will now be apparent, the remotely operable control means 400 through the movement of either of the members 405 and 406, in either direction and to a selected extent, will effect the desired rotation of the motors 140 and 143 and at a desired rate of motor speed, whereby to effect the desired translation of the intermediate carriage 122 of the pipe racker assembly 52 as well as desired extension and retraction of the racker arm 135 thereof.

The control means 500 includes normally open microswitches corresponding to those included in the control means 400 as previously described, namely, a first microswitch 501 connected by a circuit, one side of which is designated 502, to the solenoid valve 304b which controls the upper carriage motor 143b; and a second microswitch 503 connected by a circuit, one side of which is designated 504, to the solenoid valve 306b which controls the operation of the upper racker arm motor 143b. A rotary operator 505 is adapted to effect closure of the micro-switch 501 and a similar rotary operator 506 is adapted to effect closure of the micro-switch 503. Operator 505 is a gear segment in mesh with a gear 507 which drives the center tap of a potentiometer generally denoted at 508. Potentiometer 508 is in a circuit 509 with a normally open relay 510, connected by a conductor 511 to the switch 501 so as to be closed when the switch 501 is closed, the circuit 509 including selsyn motor means 512 or other slave motor means which is responsive to the adjustment of the potentiometer 508 to adjust the pump actuator 302A of pump 302. The rotary operator 506 is a gear segment in mesh with a gear 513 which drives the center tap of a potentiometer generally denoted at 514. Potentiometer 514 is connected to the circuit 509 through a normally closed relay 515, this relay 515 being connected by a conductor 516 to the micro-switch 501. Therefore, the circuit 509 and the function of the slave motor means 512 may be affected only by one of the rotary operators 505 and 506, since closure of the micro-switch 501 effects simultaneous opening of the normally closed relay 515 and closure of the normally open relay 510.

A similar arrangement is provided in the control means 600, including a normally closed micro-switch 601 connected in a circuit, one side of which is designated 602, with the solenoid valve 304a for controlling operation of the lower carriage motor 140a. A second micro-switch 603 is connected in a circuit, one side of which is designated 604, with the solenoid valve 306a which controls the operation of the lower racker arm motor 143a. In addition, the control means 600 includes a rotary operator 605 for closing the micro-switch 601 and another rotary operator 606 for closing the micro-switch 603. Operator 605 is a gear segment in mesh with a gear 607 which drives the center tap of a potentiometer generally denoted at 608 which is connected in a circuit 609, the latter in turn being connected with the circuit 509 through a normally open relay 610, this relay 610 being connected by a conductor 611 to the micro-switch 601, whereby upon closure of the relay 610 the potentiometer 608 may regulate the slave motor means 512 for the pump control 302A. Likewse, the rotary operator 606 is a gear segment in mesh with a gear 613 which drives the center tap of a potentiometer generally designated at 614 which is connected to the circuit 609 by a normally closed relay 615, thus here again the slave motor means 515 is operable only in response to movement of one or the other of the rotary operators 605 and 606, provided that selector means 700 hereinafter described is conditioned to permit such operation.

This selector means, generally denoted at 700, is provided whereby to enable the selective utilization of the control means 500 or the control means 600 to effect operation of the upper racker assembly 51 by the derrick man A, at the console 117, or by the floor man B, at the console 117b. This selective means 700, in other words, enables the control means 600 at the floor man's console 117b, for example, to selectively effect the operation of either the upper racker apparatus 51 or the lower casing handling or racking apparatus 62, individually. Illustratively, the selector means comprises a selector switch 701 which has a central inactive position, "UPPER (DERRICK)," at which the operation of the upper racker apparatus 51 is under the control of the control means 500 at the derrick man's console 117. Under these circumstances, the solenoid valve 308 will be in the condition shown in FIG. 9, establishing communication between the pump 302 and the upper racker hydraulic system. This switch 701 has one contact designated 702 which is in circuit with a number of relays, whereby when the switch is in a first position, "UPPER (FLOOR)," the control means 600 at the floor man's console 117b is effective to control the operation of the upper racker apparatus 51. The switch contact 702 is in circuit with a first normally opened relay 703 which is interposed between the normally open and normally closed relays 610 and 615 of the control means 600 and the circuit 609 previously referred to, so that when the normally open relay 703 is closed responsive to closure of the selector switch 701 the control means 600 is connected to the circuit 509 through the relay 703. At the same time, the control means 500 is disconnected from the circuit 509 by a normally closed relay 704 which is in series circuit with the normally open relay 703. Likewise, a normally closed relay 705 in series circuit with the relays 703 and 704 will be opened so as to interrupt the connections 502 and 504 between the micro-switches 501 and 503, respective, and the solenoid valves 304b and 306b. Thus, when the selector switch 701 is in engagement with the contact 702 the control means 500 is rendered inoperative either to effect operation of the solenoid valves 304b and 306b or the slave motor means 512. Also in circuit with the contact 702 of the selector switch 701 is a normally open relay 706 which when closed is adapted to establish, via a conductor 707, the circuit between the micro-switch 601 of the control means 600 and the solenoid valve 304b which controls operation of the upper carriage motor 140b of the upper racker apparatus 51. Similarly, the normally open relay 706 when closed is adapted to establish connection, via a conductor 708, between the mirco-switch 603 and the solenoid valve 306b which controls the operation of the arm actuating motor 143b of the upper racker apparatus 51. The selector switch 701 has another position, "LOWER," including a contact 709 which is in circuit with another normally open relay 710. Closure of the switch contact 709 is effective to close the relay 710 to complete a circuit via a conductor 711 between the micro-switch 601 and the lower carriage solenoid valve 304a; and closure of the normally open relay 710 will effect a connection, via a conductor 712, between the microswitch 603 and the lower arm solenoid valve 306a.

Accordingly, the control members 605 and 606 in the control means 600 are respectively operable to effect translation of either the upper carriage or the lower carriage of the racker apparatus 51 or 62 or to effect operation of the arms of the respective upper and lower racker apparatus 51 and 62, depending upon the selective condition of the selector switch 701. Thus, when the selector switch 701 is employed to close contact 702 the upper racker apparatus 51 is operable by the control means 600 at the floor man's console 117b, but when the selector switch contact 709 is closed then the same control means 600 is effective to cause operation of only the lower racker apparatus 62. Moreover, when the contact 709 is closed, the circuit to solenoid valve 308 is also closed to shift the valve 308 to its position allowing flow of fluid to motors 140a and 143a from pump 302.

From the foregoing it will be apparent that in the utilization of any of the control means 400, 500, and 600, a stand of pipe supported in the racker heads 119 and 152 may be moved in either of two directions, i.e., either on a horizontal X axis or a perpendicular Y axis, at a rate and to the extent desired. In such operations to extent of movement of any of the rotary control members 405, 406 or 505, 506, or 605, 606, regardless of the condition of the selector switch 701 of the selector means 700, will be effective to condition one of the pumps 301 and 302 to supply fluid under pressure to the motors 140, 143 or 140a, 143a, or 140b, 143b at the desired rate and for the desired period of time to allow movement of the stand to the desired position, whereupon movement of the rotary control members aforesaid back to a starting position at which the micro-switches 401, 403 or 501, 503 or 601, 603 are open, at which point in time movement of the respective carriages and arms will be arrested and the stand of pipe will be positioned either over the well bore or between the appropriate fingers of the pipe rack finger board sections 68, 69, as previously described.

From the foregoing, it is believed that further description of the mode of operation of the apparatus and systems is unnecessary, and changes and alterations may be made without departing from the spirit of the invention.

I claim:

1. In well drilling derrick apparatus for vertically racking stands of well pipe within the derrick: rack means for receiving stands of well pipe and supporting the same in spaced vertical rows at one side of the center of the derrick, racker means for successively moving said stands between positions at the center of the derrick and said rack means, said racker means including a longitudinally extended racker arm, carriage means supporting said racker arm for longitudinal movement in a horizontal plane between projected and retracted positions relative to said rack means and the center of said derrick, means supporting said carriage for lateral movements in said derrick to place stands in and remove stands from said rack means, reversible hydraulic rotary motor means for moving said arm and said carriage means, and electrohydraulic operating means for said motor means for reversing said motor means and for selectively effecting said movements of said arm and said carriage means at a selected rate.

2. Well drilling derrick apparatus as defined in claim 1, wherein said motor means includes a first reversible hydraulic motor for moving said racker arm, a second reversible hydraulic motor for moving said carriage means, and said operating means includes a reversible and variable positive displacement pump for supplying fluid under pressure selectively to one of said motors.

3. Well drilling derrick apparatus as defined in claim 1, wherein said motor means includes a first reversible hydraulic motor for moving said racker arm, a second reversible hydraulic motor for moving said carriage means, and said operating means includes a reversible and variable positive displacement pump for supplying fluid under pressure selectively to one of said motors, and control means for regulating the operation of said pump.

4. Well drilling derrick apparatus as defined in claim 1, wherein said motor means includes a first reversible hydraulic motor for moving said racker arm, a second reversible hydraulic motor for moving said carriage means, and said operating means includes a reversible and variable positive displacement pump for supplying fluid under pressure selectively to one of said motors, control means for regulating the operation of said pump, said control means including a pair of valve means interposed between said pump and the respective motors, and means for opening one of said valve means to allow operation of one of said motors in either direction.

5. Well drilling derrick apparatus as defined in claim 1, wherein said motor means includes a first reversible hydraulic motor for moving said racker arm, a second reversible hydraulic motor for moving said carriage means, and said operating means includes a reversible and variable positive displacement pump for supplying fluid under pressure selectively to one of said motors, control means for regulating the operation of said pump, said control means including a pair of valve means interposed between said pump and the respective motors, and means for opening one of said valve means to allow operation of one of said motors in either direction and preventing simultaneous opening of the other of said pair of valve means.

6. Well drilling derrick apparatus as defined in claim 5, wherein said pair of valve means are solenoid valves, and said means for opening one of said valves and preventing opening of the other of said valves includes selectively operable operator members and switch means closable by said operator members.

7. Well drilling derrick apparatus as defined in claim 1, wherein said motor means includes a first reversible hydraulic motor for moving said racker arm, a second reversible hydraulic motor for moving said carriage means, and said operating means includes a reversible and variable positive displacement pump for supplying fluid under pressure selectively to one of said motors, control means for regulating the operation of said pump, said control means including a control member for each of said motors, a potentiometer operable by said control member, slave motor means responsive to operation of said potentiometer, and actuator means for regulating the direction and rate of displacement of said pump responsive to said slave motor means.

8. Well drilling derrick apparatus as defined in claim 1, wherein said rack means is at an elevated location in said derrick, and said racker means comprises an upper racker means above said rack means, and an intermediate racker means between said rack means and the base of said derrick, said upper and intermediate racker means being movable in unison.

9. Well drilling derrick apparatus as defined in claim 8, wherein said motor means includes individual first reversible hydraulic motors for moving said racker arms of said upper and intermediate racker means, individual second reversible hydraulic motors for moving said carriage means of said upper and intermediate racker means, and said operating means includes individual reversible and variable positive displacement pumps for supplying fluid under pressure selectively to said motors of said upper and intermediate racker means.

10. Well drilling derrick apparatus as defined in claim 8, wherein said motor means includes individual first reversible hydraulic motors for moving said racker arms of said upper and intermediate racker means, individual second reversible hydraulic motors for moving said carriage means of said upper and intermediate racker means, said operating means including individual reversible and variable positive displacement pumps for supplying fluid under pressure selectively to said motors of said upper and intermediate racker means, and individual control means for regulating the operation of said pumps respectively.

11. Well drilling derrick apparatus as defined in claim 8, wherein said motor means includes individual first reversible hydraulic motors for moving said racker arms of said upper and intermediate racker means, individual second reversible hydraulic motors for moving said carriage means of said upper and intermediate racker means, said operating means including individual reversible and variable positive displacement pumps for supplying fluid under pressure selectively to said motors of said upper and intermediate racker means, individual control means for regulating the operation of said pumps respectively, said control means each including a pair of valve means interposed between the respective pump and motors, and means for opening one of said valve means to allow operation of one of said motors in either direction.

12. Well drilling derrick apparatus as defined in claim 8, wherein said motor means includes individual first reversible hydraulic motors for moving said racker arms of said upper and intermediate racker means, individual second reversible hydraulic motors for moving said carriage means of said upper and intermediate racker means, said operating means including individual variable positive displacement pumps for supplying fluid under pressure to said motors of said upper and intermediate racker means, individual control means for regulating the operation of said pumps respectively, said control means including a pair of valve means interposed between the respective pump and motors, and means for opening one of said pair of valve means to allow operation of one of said motors in either direction and for preventing simultaneous opening of the other of said pair of valve means.

13. Well drilling derrick apparatus as defined in claim 12, wherein each of said pair of valve means is a solenoid valve, and said means for opening one of said valves and preventing opening of the other of said valves includes selectively operable operator members, and switch means closable by said operator members.

14. Well drilling derrick apparatus as defined in claim 12, wherein each of said pair of valve means is a solenoid valve, said means for opening one of said valves and preventing operation of the other of said valves including selectively operable operator members, switch means closable by said operator members, a potentiometer operable by each of said operator members, slave motor means responsive to operation of each potentiometer, and actuator means for regulating the direction and rate of displacement of the respective pumps responsive to said slave motor means.

15. Well drilling derrick apparatus as defined in claim 1, wherein said racker means is at an elevated location in said derrick, and said racker means comprises upper racker means above said rack means, an intermediate racker means between said rack means and the base of said derrick, and lower racker means, said operating means including upper operator means, intermediate operator means, and lower operator means for effecting said movements of said arm and said carriage of the respective racker means, said operating means also including means for operating said upper racker means responsive to said lower operator means.

16. Well drilling derrick apparatus as defined in claim 15, wherein said motor means includes individual first reversible hydraulic motors for moving said racker arms of said upper, intermediate, and lower racker means; individual second reversible hydraulic motors for moving said carriage means of said upper, intermediate, and lower racker means, said operating means including a variable positive displacement pump for supplying fluid under pressure to said motors of said upper and lower racker means, another variable positive displacement pump for supplying fluid under pressure to said motors of said intermediate racker means, and individual control means for regulating the operation of said pumps respectively.

17. Well drilling derrick apparatus as defined in claim 15, wherein said motor means includes individual first reversible hydraulic motors for moving said racker arms of said upper, intermediate, and lower racker means; individual second reversible hydraulic motors for moving said carriage means of said upper, intermediate, and lower racker means, said operating means including a variable positive displacement pump for supplying fluid under pressure to said motors of said upper and lower racker means, another variable positive displacement pump for supplying fluid under pressure to said motors and individual control means for regulating the operation of said pumps respectively, said control means including a pair of valve means interposed between the respective pumps and each of said motors, and means for opening one of said pair of valve means to allow operation of one of said motors in either direction.

18. Well drilling derrick apparatus as defined in claim 1, wherein said motor means and said operating means include a hydraulic reversible motor, a variable positive displacement pump connected to said motor for supplying fluid under pressure thereto in opposite directions, adjuster means for said pump for regulating the rate of flow from said pump to said motor, and means for operating said adjuster means including an operating potentiometer and slave motor means connected to said adjuster means and responsive to said operating potentiometer to vary the rate of flow from said pump.

19. The apparatus as defined in claim 18, including a solenoid valve interposed between said motor and said pump and circuit means including a switch closable by said means for operating said adjuster means to open said solenoid valve and to allow flow of fluid from said pump to said motor in either direction.

20. Well drilling derrick apparatus as defined in claim 1, wherein said motor means and said operating means include a first plurality of reversible hydraulic motors, a second plurality of reversible hydraulic motors, variable positive displacement pump means for supplying fluid under pressure to said pluralities of motors, adjuster means for varying the rate of displacement of said pump means, operating means for said adjuster means including an operating potentiometer and slave motor means for operating said adjuster means in response to operation of said potentiometer.

21. The apparatus as defined in claim 20, including normally closed solenoid valves interposed between said pump means and each of said motors, and normally open switch means closable by said operating means for opening said solenoid valves.

References Cited

UNITED STATES PATENTS

| | | | |
|---|---|---|---|
| 2,685,378 | 8/1954 | Stone | 214—2.5 X |
| 2,730,246 | 1/1956 | Stone | 214—2.5 |
| 3,194,313 | 7/1965 | Fanshawe | 214—2.5 X |
| 3,488,692 | 1/1970 | Oda et al. | 214—1 (B3) |

GERALD M. FORLENZA, Primary Examiner

F. E. WERNER, Assistant Examiner

FO-1050
(5/69)

UNITED STATES PATENT OFFICE
CERTIFICATE OF CORRECTION

Patent No. 3,615,027　　　　　　　　Dated October 26, 1971

Inventor(s) JOHN E. HAM

It is certified that error appears in the above-identified patent and that said Letters Patent are hereby corrected as shown below:

Col. 3, line 23, after "herein" insert --illustrated--;
　　　line 54, "position" should be --piston--.
Col. 6, line 1, "face" should be --fact--.
Col. 12, line 65, "515" should be --512--.
Col. 13, line 31, "respective" should be --respectively--.
Col. 14, line 2, "to", second occurrence, should be --the--.
Col. 16, line 67 (Claim 17), after "motors" insert --of said intermediate racker means,--.

Signed and sealed this 3rd day of April 1973.

(SEAL)
Attest:

EDWARD M. FLETCHER, JR.　　　　　　ROBERT GOTTSCHALK
Attesting Officer　　　　　　　　　Commissioner of Patents